(12) United States Patent
Francis (10) Patent No.: US 10,740,747 B2
(45) Date of Patent: Aug. 11, 2020

(54) NFC-ENABLED DEVICES FOR PERFORMING SECURE CONTACTLESS TRANSACTIONS AND USING HCE

(71) Applicant: Orange, Paris (FR)

(72) Inventor: Lishoy Francis, Surrey (GB)

(73) Assignee: ORANGE, Paris (FR)

( * ) Notice: Subject to any disclaimer, the term of this patent is extended or adjusted under 35 U.S.C. 154(b) by 4 days.

(21) Appl. No.: 15/579,270

(22) PCT Filed: May 30, 2016

(86) PCT No.: PCT/EP2016/062193
§ 371 (c)(1),
(2) Date: Dec. 4, 2017

(87) PCT Pub. No.: WO2016/193227
PCT Pub. Date: Dec. 8, 2016

(65) Prior Publication Data
US 2018/0165673 A1    Jun. 14, 2018

(30) Foreign Application Priority Data

Jun. 2, 2015    (EP) .................................... 15305848

(51) Int. Cl.
*G06Q 20/32*    (2012.01)
*H04W 4/80*    (2018.01)
(Continued)

(52) U.S. Cl.
CPC ......... *G06Q 20/3278* (2013.01); *G06F 21/57* (2013.01); *G06F 21/74* (2013.01);
(Continued)

(58) Field of Classification Search
CPC ........... G06Q 20/3278; G06Q 20/3227; G06Q 20/3229; G06Q 20/382; G06Q 20/3226;
(Continued)

(56) References Cited

U.S. PATENT DOCUMENTS 8,712,407 B1    4/2014    Cope et al.
8,935,746 B2 *    1/2015    Vetillard .............. G06F 21/606
726/2
(Continued)

FOREIGN PATENT DOCUMENTS

WO    WO-2011128499 A1 *    10/2011    ............. G06Q 20/20
WO    WO-2013188830 A1 *    12/2013    ............. G06F 21/53
WO    WO-2015047224 A1 *    4/2015    ............. H04L 63/20

OTHER PUBLICATIONS

Waqar; Anwar et al., Redesigning secure element access control for NFC enabled android smartphones using mobile trusted computing, Jun. 24-26, 2013, International Conference on Information Society (Year: 2013).*

(Continued)

*Primary Examiner* — Abhishek Vyas
*Assistant Examiner* — Jordan W Marsh
(74) *Attorney, Agent, or Firm* — David D. Brush; Westman, Champlin & Koehler, P.A.

(57) ABSTRACT

In a device that is both NFC-enabled and trusted execution environment (TEE)-enabled, and has a secure element (SE), a host card emulation (HCE) based software application acts as a front-end/proxy and processes non-sensitive security functions, while a trusted application in the TEE and an applet on the SE cooperate to process security-sensitive functions. An end-to-end security relationship may be established between a subscriber identity module (SIM), the TEE and a SAM (Secure Authentication Module) provided for a second NFC-enabled device (e.g. a contactless reader) that communicates with the first device in a contactless manner. The solution integrates HCE, TEE, SE and SAM for enabling secure contactless applications, and it also supports advanced security measures.

12 Claims, 11 Drawing Sheets

(51) Int. Cl.
*G06F 21/57* (2013.01)
*G06F 21/74* (2013.01)

(52) U.S. Cl.
CPC ..... *G06Q 20/3227* (2013.01); *G06Q 20/3229* (2013.01); *H04W 4/80* (2018.02)

(58) Field of Classification Search
CPC .. G06Q 20/322; H04W 4/80; H04W 12/0023; G06F 21/57; G06F 21/74
See application file for complete search history.

(56) References Cited

U.S. PATENT DOCUMENTS

| | | | |
|---|---|---|---|
| 10,152,706 B2* | 12/2018 | Caceres | G06Q 20/3229 |
| 2013/0060959 A1 | 3/2013 | Taveau et al. | |
| 2014/0317686 A1* | 10/2014 | Vetillard | G06F 21/606 726/2 |
| 2016/0294826 A1* | 10/2016 | Han | G06Q 20/3226 |

OTHER PUBLICATIONS

Samia Bouzefrane et al., Trusted Platforms to Secure Mobile Cloud Computing, Aug. 20-22, 2014, 2014 IEEE Intl Conf on High Performance Computer and Communications (Year: 2014).*

W.D. Chen et al., Using 3G network components to enable NFC mobile transactions and authentication, 2010 IEEE International Conference on Progress in Informatics and Computing, Shanghai, 2010, pp. 441-448. (Year: 2010).*

J. C. Paillès et al., "Payment and privacy: A key for the development of NFCmobile," 2010 International Symposium on Collaborative Technologies and Systems, Chicago, IL, 2010, pp. 378-385. (Year: 2010).*

International Search Report dated Jul. 19, 2016 for corresponding International Application No. PCT/EP2016/062193, filed May 30, 2016.

Witten Opinion of the International Searching Authority dated Jul. 19, 2016 for corresponding International Application No. PCT/EP2016/062193, filed May 30, 2016.

* cited by examiner

NFC-ENABLED DEVICES FOR PERFORMING SECURE CONTACTLESS TRANSACTIONS AND USING HCE

CROSS-REFERENCE TO RELATED APPLICATIONS

This Application is a Section 371 National Stage Application of International Application No. PCT/EP2016/062193, filed May 30, 2016, which is incorporated by reference in its entirety and published as WO 2016/193227 A1 on Dec. 8, 2016, in English.

FIELD OF THE DISCLOSURE

The present invention relates to the domain of near field communications (NFC). More particularly, the invention relates to NFC-enabled devices that use host card emulation (HCE) and implement secure contactless transactions.

BACKGROUND OF THE DISCLOSURE

Near field communications (NFC) technology has been standardised via various specifications and technical standards such as ISO//IEC 14443 (for proximity cards), and ISO/IEC 15693 (for the longer range "vicinity cards"), and various technical specifications published by the NFC forum.

Near field communications (NFC) technology has developed from the stage where it was employed primarily to enable contactless near-proximity transactions to be performed between a smart card and a reader to the stage, today, where NFC capability is built into many devices, e.g. mobile phones. Moreover, whereas contactless cards often were dedicated for use in a single application (e.g. ticketing on a mode of transport operated by a single company), NFC-enabled devices such as mobile phones are generally designed to be capable of participating in NFC transactions in different applications.

Figure 1:
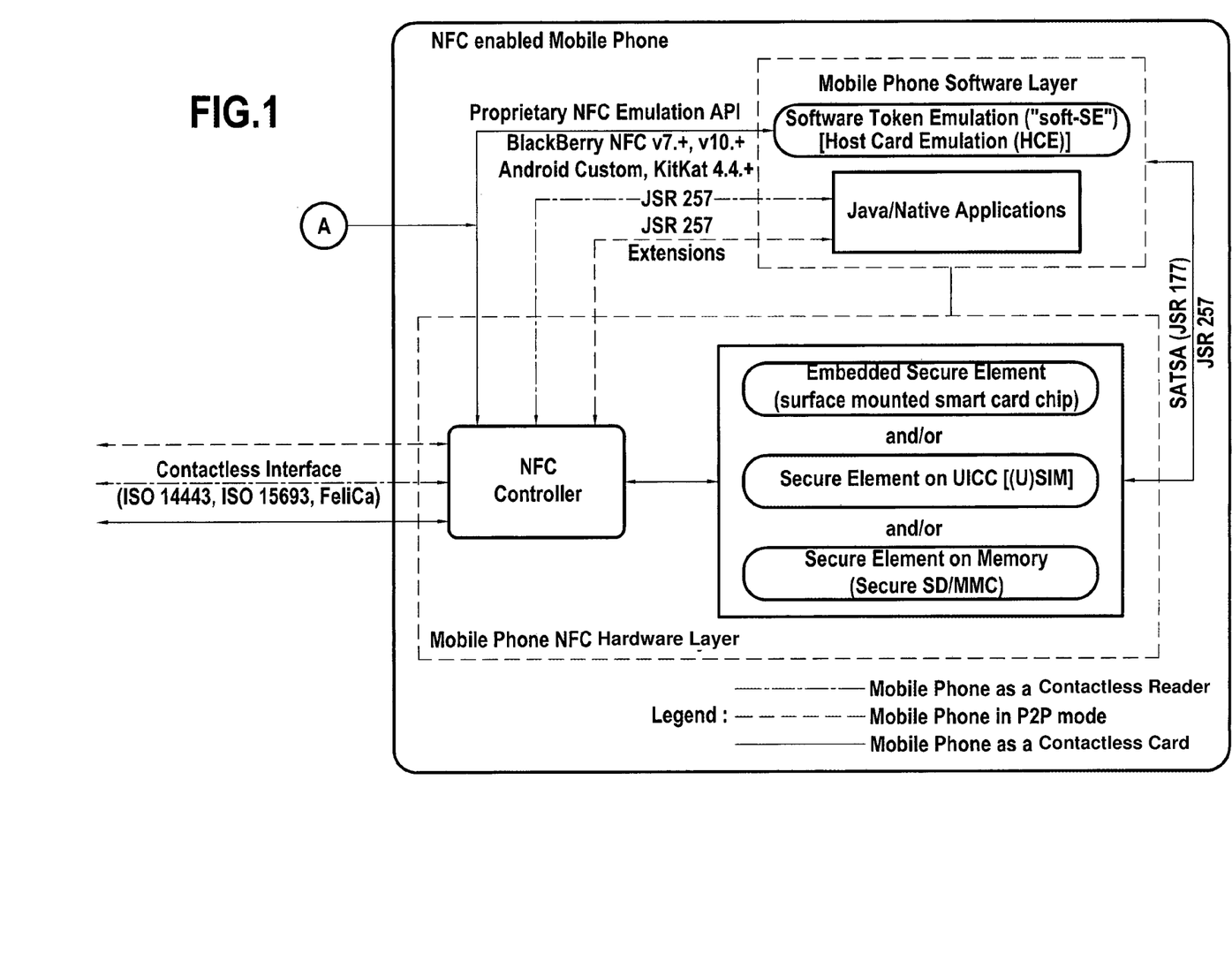
FIG. 1 illustrates an example of an NFC-enabled mobile phone that has one or more than one SE and soft-SE.

An NFC-enabled mobile phone generally has the capacity to emulate a reader (NFC initiator), to emulate a contactless card (NFC target/responder) and/or to operate in a peer-to-peer manner. FIG. 1 is a highly-simplified diagram representing an NFC-enabled mobile phone and illustrates connections and protocols that may be used when the phone acts as a contactless reader (represented using arrows with long and short dashes), those that may be used when the device operates in a peer-to-peer mode (represented using dashed arrows), and those that may be used when the device operates as a contactless card (represented using solid-line arrows.

In the present document the expression "responder" will be used for a device that responds to commands received by NFC as part of a contactless transaction, irrespective of whether the device is emulating a contactless card or operating in P2P mode. In a similar way, the expression "initiator" will be used for a device that issues commands by NFC as part of a contactless transaction, irrespective of whether the device is emulating a contactless reader or operating in P2P mode.

NFC-enabled devices, for example mobile phones, are becoming widely used in real world contactless applications such as payments, ticketing, identification, access control, healthcare, retail, and so forth. However, bare compliance with NFC technical standards is not necessarily sufficient to ensure adequate security in contactless transactions.

It should be noted that the expression "transaction" is used in this document in a general sense to designate an exchange of data to achieve some purpose (i.e. it is not limited to exchanges that result in a sale or acquisition).

Often, in devices that have NFC capability security is provisioned within a secure element (SE). The SE is envisaged and designed to provide security to, and confer trust on, the devices as they participate in the underlying contactless applications. Typically the SE stores data such as sensitive information, credentials, privileges, and so on.

Traditionally an SE is a hardware element that is typically realized on dedicated and highly trustworthy, tamper resistant platforms such as a smart card micro-controller and is typically enabled with ecosystems such as Java Card, MIFARE, and card management systems such as Global Platform.

In NFC-enabled devices that incorporate an SE, it is the SE that communicates with the NFC controller during performance of a contactless transaction. The host operating system (OS) of the device may be able to communicate with the SE to obtain certain non-sensitive data about the transaction, for example for display to the user, but cannot communicate directly with the NFC controller.

The form factor of the SE can be different depending on the specific implementation: for example it may be an embedded SE (surface-mounted integrated circuit), a suitable SIM card (e.g. UICC SE, SWP-SIM), or an SE in the form of a secure memory card (e.g. SD card, MMC). The acronym SWP-SIM refers to a SIM which is connected to the NFC chip (or "contactless front-end", CLF) by a single conductor according to the Single Wire Protocol codified by the European Telecommunications Standards Institute (ETSI) in technical specifications such as ETSI TS 102 613 V.11.0.0 (physical and data link layer) and ETSI TS 102 613 V.11.0.0 (host controller interface). Hybrid NFC-enabled mobile phones incorporate more than one type of SE within the same phone.

More recently, there have been proposals to implement software-based secure element emulation (soft-SE), also known as host card emulation (HCE), in NFC-enabled devices such as mobile phones. This type of soft-SE is realised within an application processor—e.g. a Mobile Application Processor (MAP)—and executes within the device's underlying untrusted operating system (rich OS) such as Android. Tokens that the NFC controller obtains from the host OS may not be trustworthy.

In the present document, unless the context requires otherwise the expression "SE" or "secure element" designates a physical (hardware) secure element and a secure element implemented in software (program code) is designated "soft-SE".

A soft-SE can co-exist with other SE form-factors (e.g. embedded-SE, UICC-SE, etc.) and provides greater control for platform/ecosystem providers. In devices that are HCE-enabled the NFC controller (CLF) is configured so that it can interact with the SE or the host OS (HCE) depending on the application in which the contactless transaction is being performed.

Serious security issues have been reported in respect of mobile platforms utilizing HCE. Various software-based security measures have been proposed to improve security in HCE-enabled devices, to compensate for the lack of a SE. Thus, for example, to mitigate the effects of a security breach payment tokens of temporary validity may be provisioned securely in the phone (from the cloud). However, these approaches for assuring security may require the intervention of additional parties and processes (e.g. token provision services), making the overall operation more complex and involving onerous administration.

In the face of the current lack of consensus in the industry regarding how to implement SE for NFC, there is a need for new security mechanisms, especially for HCE, in order to protect applications and services.

SUMMARY

The present invention has been made in the light of the above situation.

Certain embodiments of the invention provide a device having near field communications (NFC) capability and comprising:
an NFC controller;
a host operating system (OS),
a trusted execution environment (TEE),
a secure element (SE),
a contactless-transaction software application to run on the host OS,
a trustlet to run in the TEE, and
an applet to run on the SE;
wherein:
the TEE and SE are configured to establish a secure channel for communication with each other,
the NFC controller is responsive to reception, from an external device, of a command invoking a determined security protocol, to transmit to the contactless-transaction application a request for security-endorsed data;
the contactless-transaction application is responsive to reception of the request for security-endorsed data, from the NFC controller, to send a request to the trustlet to trigger generation of security-endorsed data;
the trustlet is responsive to said request from the contactless-transaction application to communicate with the applet via said secure channel to generate security-endorsed data whose security-endorsement can be validated by the external device, and to return the security-endorsed data to the contactless-transaction application; and
the contactless-transaction application is responsive to reception of the security-endorsed data, from the trustlet, to send the security-endorsed data to the NFC controller for transmission to said external device.

The above device can implement HCE with enhanced security end-to-end, and confer trust, because, when commands that require particular security are implemented during a contactless transaction, the TEE and SE can cooperate to produce security-endorsed data that is secure and trustworthy.

Other operations and commands that are required during performance of the contactless transaction but which do not require particularly great security may be performed by the host OS. The application processor used by the host OS has greater processing power than the smart card micro controllers usually provided by an SE and so this approach takes advantage of the processing power of the host OS. Moreover, the host OS can access larger memory storage than a smart card micro controller and can access APIs which are not normally available in an SE.

The trustlet in the TEE may be designed to obtain data from the applet in the SE in response to a request from the contactless-transaction application, and to send the security-endorsed data to the contactless-transaction application only if the data received from the applet has been validated. By virtue of this validation, a secure authentication module in an external device that receives the security-endorsed data has an assurance that the security-endorsed data can be trusted.

The applet may respond to a request for data, from the trustlet, by performing a process that includes application of a digital signature, and transmission of digitally-signed data to the trustlet. In such a case the trustlet may check that the digitally-signed data has been signed by a valid digital signature of the SE, thereby enhancing the security of generation of the security-endorsed data.

The applet may be configured to generate a one-time code (OTC) as part of the process for generating the security-endorsed data. Such a one-time code may be synchronized with the external device, thus providing a reliable way for the external device to check the identity of the SE.

The TEE and SE may be configured to establish a secure channel for communication with each other via the host OS. In such a case the SE may encrypt the above-mentioned one-time code (OTC) using a first key known to the TEE and SE so that the data is secure as it transits through the host operating system.

When the trustlet validates the data it has received from the applet it may apply its own digital signature to the validated data and encrypt the validated data, as a way of increasing the security of the security-endorsed data.

The above-mentioned device may have a timer module to measure a predetermined time interval during generation of the security-endorsed data. If the timer module assesses the duration of the measured time interval relative to a criterion indicative of normal operation and finds that the measured time interval does not respect the criterion then the timer module may implement a security procedure (e.g. abort the contactless transaction or execution of the current command, issue a notification signalling the irregularity, log the occurrence of the irregularity, and so on).

In a case where the above-mentioned device is a mobile phone the SE may be a SIM, e.g. an UICC (Universal Integrated Circuit Card). SIMs are tamper-resistant tokens that support strong user authentication (e.g. PIN validation) and offer secure storage. SIMs have the advantage that they are standardised, interoperable, and portable.

Certain further embodiments of the invention provide an initiator device having near field communications (NFC) capability, the initiator device comprising:
a contactless-transaction software application,
a control module to control transmission of commands to an external device to perform a contactless transaction with the external device according to the contactless-transaction application, and
a secure authentication module,
wherein:
the control module comprises a security-evaluation module to determine respective security requirements associated with different commands to be transmitted to the external device, and the control module is responsive to a determination by the evaluation module that a given command has a high security requirement, to cause transmission to the external device of a command invoking a determined security protocol and comprising said given command,
and the secure authentication module is responsive to reception of security-endorsed data received from the external device in response to said command invoking the determined security protocol, to perform an authentication procedure on the security-endorsed data.

An initiator device as described above can ensure adequate security for contactless transactions that are performed with intervention of the host OS of the receptor device, by invoking a security protocol that obtains security-endorsed data from the receptor device and authenticating the security-endorsed data.

The initiator device may comprise a timer module to measure the time interval between transmission, to a determined responder device, of a command invoking the determined security protocol and the reception of security-endorsed data in response from said determined responder device, to assess the duration of the measured time interval relative to a criterion indicative of normal operation, and to implement a security procedure responsive to a determination that the duration of the measured time interval does not satisfy the criterion.

Yet further embodiments of the invention provide a method of performing a contactless transaction between a first NFC-enabled device and a second NFC-enabled device, the first NFC-enabled device comprising a secure authentication module, and the second NFC-enabled device comprising a host operating system (host OS), a trusted execution environment (TEE), and a secure element (SE), the TEE and SE being configured to establish a secure channel for communication with each other, the method comprising:

transmission by the first NFC-enabled device to the second NFC-enabled device of a command invoking a determined security protocol, in response to reception by the second NFC-enabled device of the command invoking the determined security protocol, transmission, by a contactless-transaction application executing on the host OS of the second NFC-enabled device, to a trustlet executing in the TEE, of a request for security-endorsed data, said trustlet and an applet in the SE communicating via said secure channel to generate security-endorsed data;

transmission of the security-endorsed data from the second NFC-enabled device to the first NFC-enabled device; and authentication of the security-endorsed data by the secure authentication module of the first NFC-enabled device.

The above-described method provides end-to-end security when contactless transactions are performed that involve a responder device that implements HCE.

BRIEF DESCRIPTION OF THE DRAWINGS

Further features and advantages of embodiments of the present invention will become apparent from the following description of said embodiments, which is given by way of illustration and not limitation, illustrated by the accompanying drawings, in which.

DETAILED DESCRIPTION OF ILLUSTRATIVE EMBODIMENTS

Certain embodiments of the invention will now be described for the purposes of illustration, not limitation.

Figure 2:
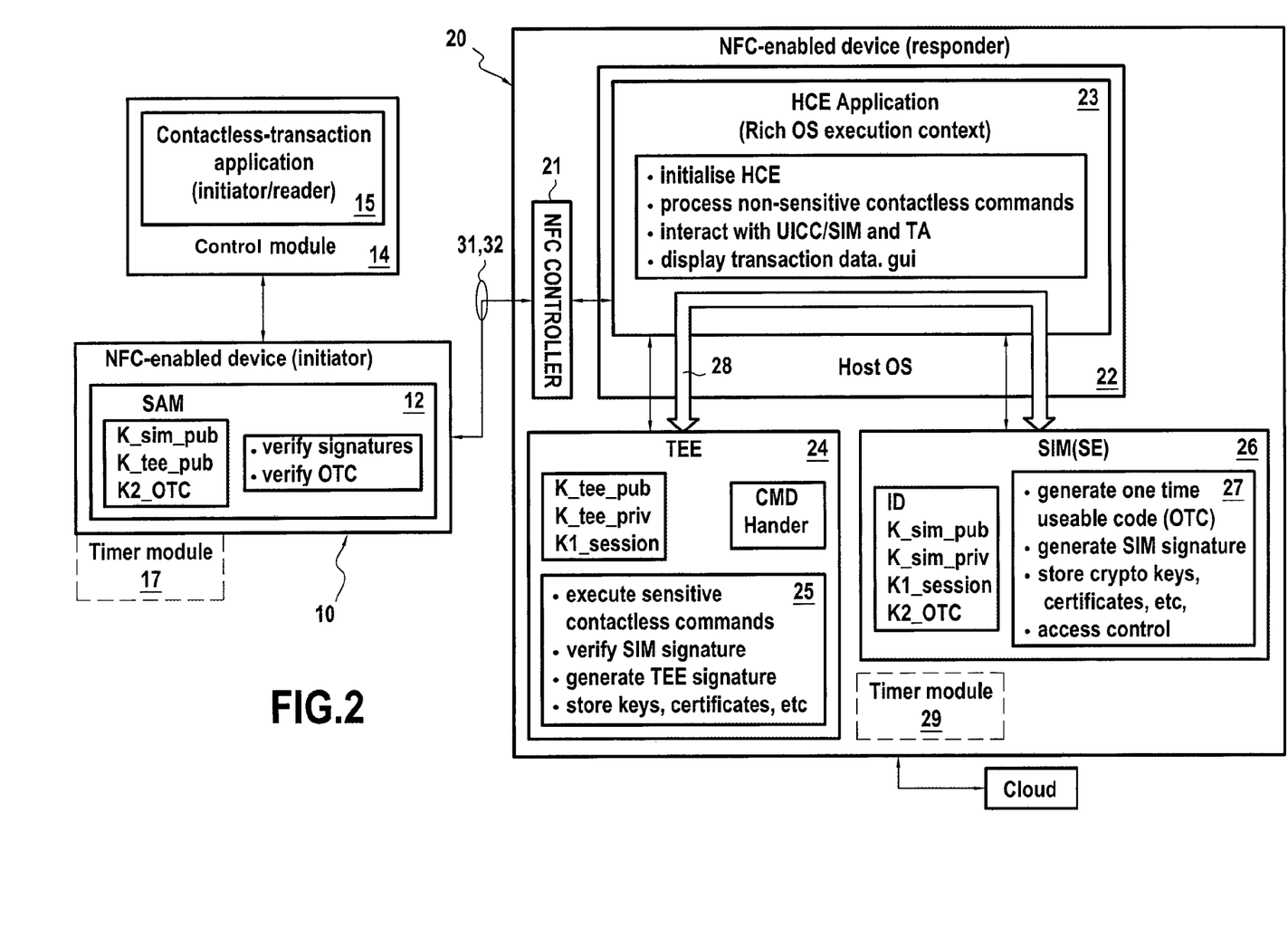
FIG. 2 is a diagram illustrating an example of NFC-enabled devices arranged to communicate by NFC in a method of performing a contactless transaction according to an embodiment of the invention.

FIG. 2 is a diagram illustrating an example of NFC-enabled devices arranged to communicate by NFC in a method of performing a contactless transaction according to an embodiment of the invention. In the example illustrated in FIG. 2, a first NFC-enabled device 10 operates as an initiator in a contactless transaction performed by NFC with a second NFC-enabled device 20. The NFC-enabled device 20 operates as an NFC-responder in this transaction. Below, for the purposes of illustration not limitation, the description shall be presented for an example case in which the device 10 is a contactless reader and the device 20 is an NFC-enabled mobile phone.

In the example illustrated in FIG. 2, the contactless reader 10 has a secure authentication module (SAM) 12 and participates in contactless (NFC) transactions under the control of a control module 14 configured to run a contactless-transaction application 15. In a case where the first NFC-enabled device 10 is a dedicated reader device the application 15 has at least the functionality required for the reader-side operations involved in implementation of the transaction. Additional functionality is present in the case where the first NFC-enabled device 10 can also operate as a responder (including P2P operation). The contactless-transaction application 15 may be installed and run on a control module 14 that is integrated into the same device as the SAM 12 or it may be installed/run in another device that communicates with the SAM 12. In the latter case the NFC-enabled device 10 may have its own local control module.

The SAM 12 is configured to perform various functions in order to authenticate security-endorsed data that is obtained from the second NFC-enabled device 20 during a secured contactless transaction according to an embodiment of the invention. FIG. 2 illustrates the case where the authentication functions include verification of signatures and verification of a one-time code (OTC). The SAM is configured to hold various secrets that are used during implementation of the authentication functions. FIG. 2 illustrates the case where the secrets include the public keys of an SE and TEE in the second NFC-enabled device, as well as a key involved in authentication of the OTC.

Optionally the contactless reader 10 may include a timer module 17 to produce a timing benchmark (discussed below).

In the example illustrated in FIG. 2, the mobile phone 20 is an NFC-enabled, mobile phone comprising an NFC controller 21, a host operating system 22 (e.g. a Rich OS), a trusted execution environment 24 and a secure element 26.

Figure 3:
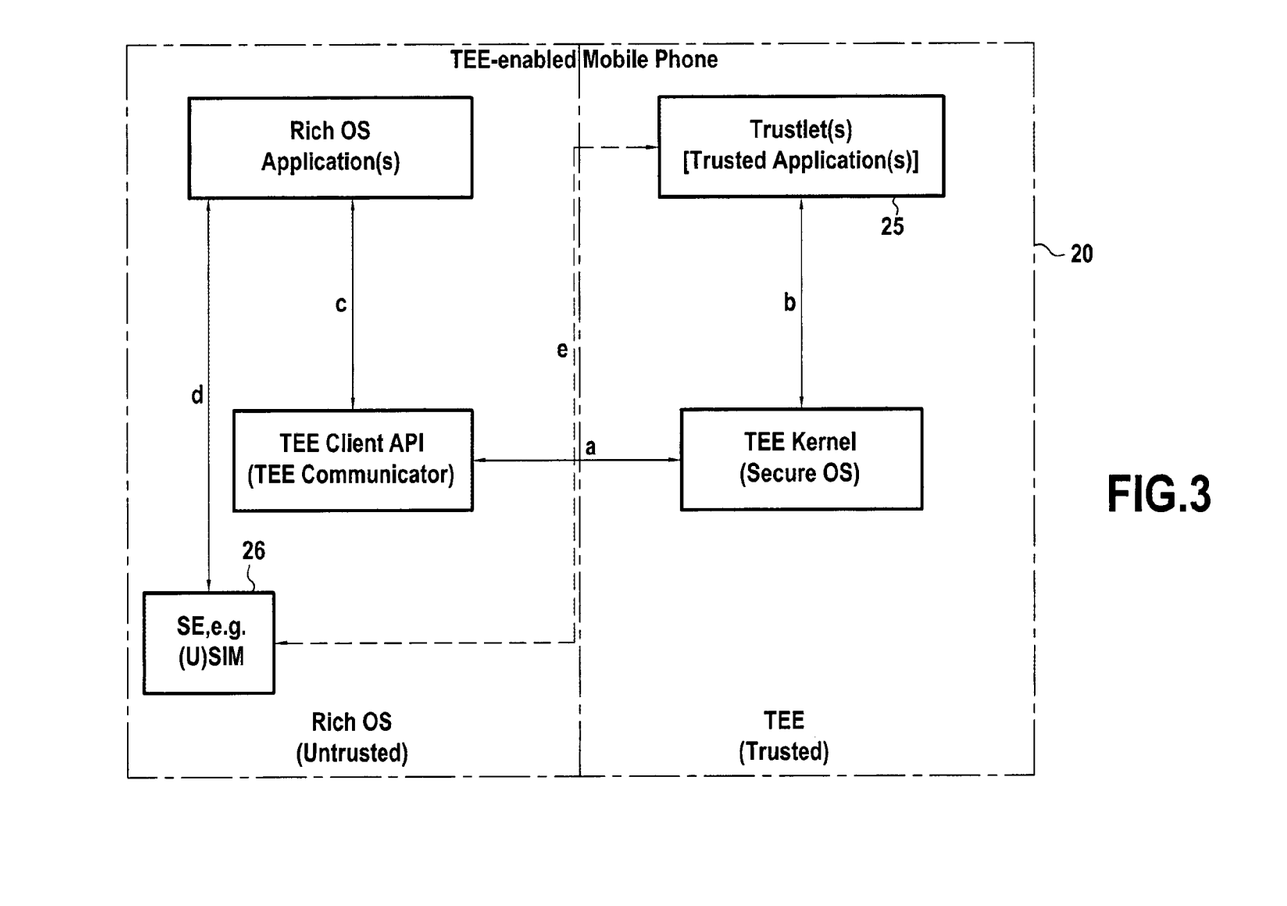
FIG. 3 is a diagram illustrating an example of a TEE-enabled mobile phone that may be used to implement an NFC-enabled device according to certain embodiments of the invention.

The mobile phone 20 is a TEE-enabled mobile phone. The design principles of TEE include process isolation, protecting sensitive apps and data by providing security containers or domains, protecting assets and resources based on access control & cryptography, and provide highly trustworthy user interface (UI) for sensitive operations such as PIN input for user authentication. TEE is standardized and is fast becoming available in several mobile phone platforms. As illustrated in FIG. 3 the core of TEE architecture is a secure operating system, which manages Trustlets (or Trusted Applications, TA), and its secure interaction with Rich OS applications (shown as (a) in FIG. 3). The Rich OS applications can securely communicate and interact with TA (shown as (c, a, b) in FIG. 3). They can also interact with SEs such as SIM/(U)SIM/UICC (shown as (d) in FIG. 3). It is important to note that in the current state of the art there is not a standardized secure channel between a SE (such as SIM/(U)SIM/UICC) and a trusted application TA.

Returning to FIG. 2, the mobile phone 20 includes elements for implementing HCE, including an HCE application 23 to run in the host OS 22, an HCE-associated trustlet 25 to run in the TEE HCE, and an HCE-associated Applet 27; and various links between aforementioned components. Optionally the mobile phone 20 may include a timer module 29 to produce a timing benchmark (discussed below). Although not illustrated in FIG. 2, the processing infrastructure of the mobile phone 20 typically includes additional elements such as APIs, and a Secure OS for the TEE.

In the case where the second NFC-enabled device 20 is a mobile phone, the SE 26 may be a SIM. SIM is a highly-trustworthy core mobile network operator asset. It is tamper resistant platform that is capable of performing secure computations (e.g. cryptographic operations), support strong user authentication (e.g. PIN validation) and provide secure storage for credentials. SIM is a standardized, interoperable, portable, and has been used to successfully deploy security to subscribers. It is a proven platform that is capable of enforcing security. Advanced smart card platform such as Universal (UICC) support more than one of subscriber identity application such as SIM and USIM. For simplicity purposes we refer to SIM or USIM or (U)SIM as either "SIM" or "UICC".

The subsequent description will be given in relation to the case where the SE 26 is a SIM. However it will be understood that corresponding functions may be implemented in a case where the SE 26 has other form factors.

Figure 4:
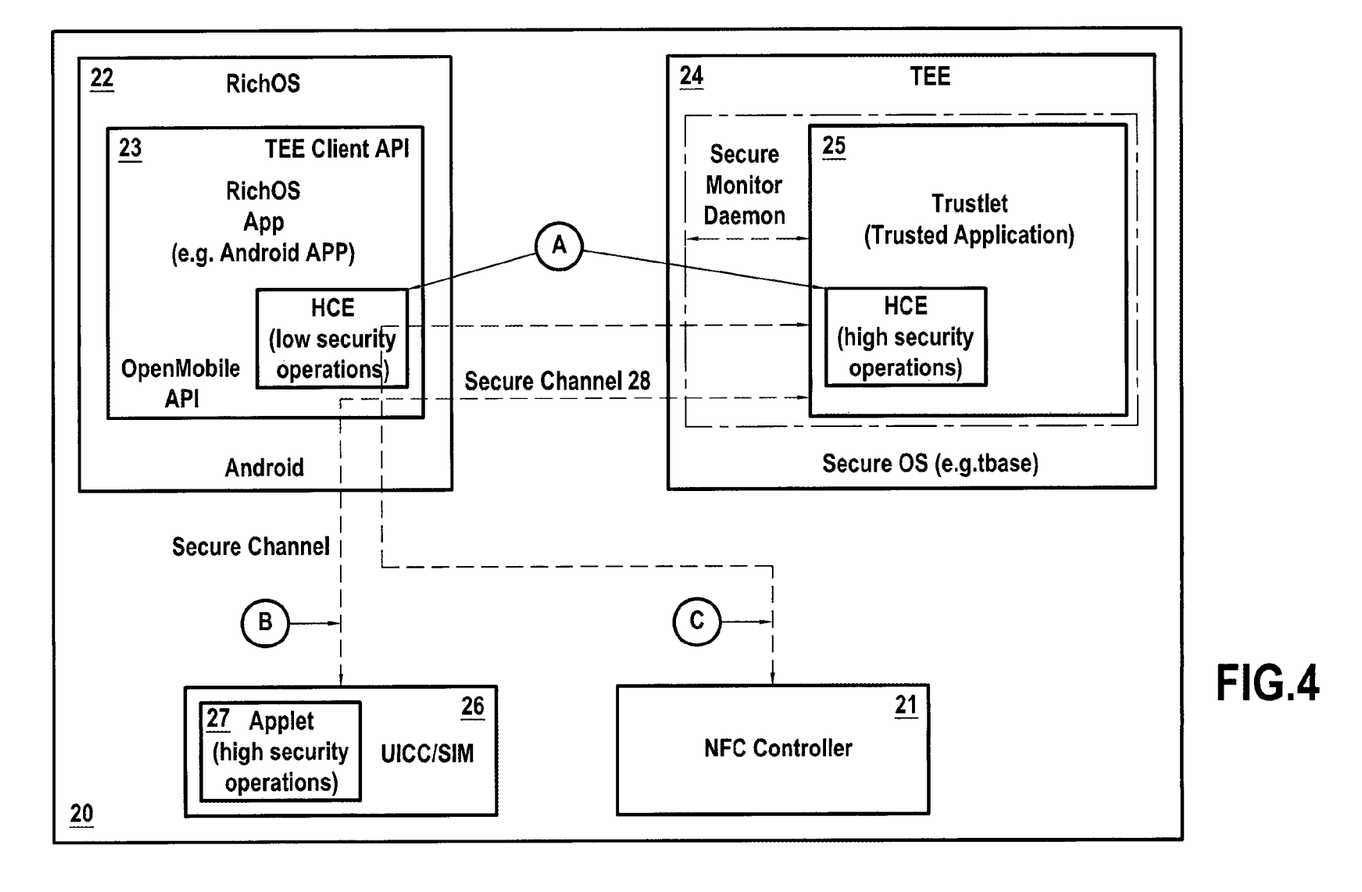
FIG. 4 is a diagram illustrating communications channels between components of an NFC-enabled device 20 of FIG. 2.

FIG. 4 illustrates how HCE functionalities may be extended to a TEE (as shown by label (A)) in certain embodiments of the invention. A secure channel between UICC 26 and trustlet 25 is realized to utilize UICC's security features and thereby enhance the security of HCE (as shown in FIG. 4 by the arrow (B)). It is important to note that in the present art there exists no link between an NFC controller NFC controller and TEE. In certain embodiments of the invention a virtual trusted link is provided between TEE and NFC controller (as shown in FIG. 4, arrow marked (C)).

In certain embodiments of the invention, an HCE based contactless application emulates an SE whereby the low security contactless functions are performed in the Rich OS context and the high security contactless functions are performed in the Secure OS and the UICC context. In other words, on a TEE enabled device, an HCE based application acts as a front-end/proxy and processes any non-sensitive security functions. While the Trusted Application in the TEE and Applet on the SE process security sensitive functions.

A general outline of the interaction involved in an example embodiment of our invention will now be described with reference to FIG. 4. As a first step the HCE component 23 in the Rich OS context is initialised, and made ready for transaction, in accordance to the principles of the supported contactless technology. For example, if ISO 14443-A is supported by the HCE-associated application 23 run in the host OS, then layer 3 and 4 procedures are first completed, and then HCE-associated application 23 is ready for any exchange of application data. Any contactless message 31 that is received by the NFC controller 21 from the reader application 10 (e.g. Point-of-Sale) is first passed to the HCE component 23 that is executing in the Rich OS context 22. It is then processed, translated to the Secure OS context, and then the resultant data 28 is transferred to the HCE secure extension (trustlet 25) that is operating in the TEE context 24. The HCE extension 25 in the TEE context processes this data and translates into UICC context and transfers the data to the HCE applet 27 residing in the UICC 26. The applet 27 in the UICC 26 processes the data received and provides an adequate response to the HCE component 25 in the TEE context over a secure channel.

Figure 5:
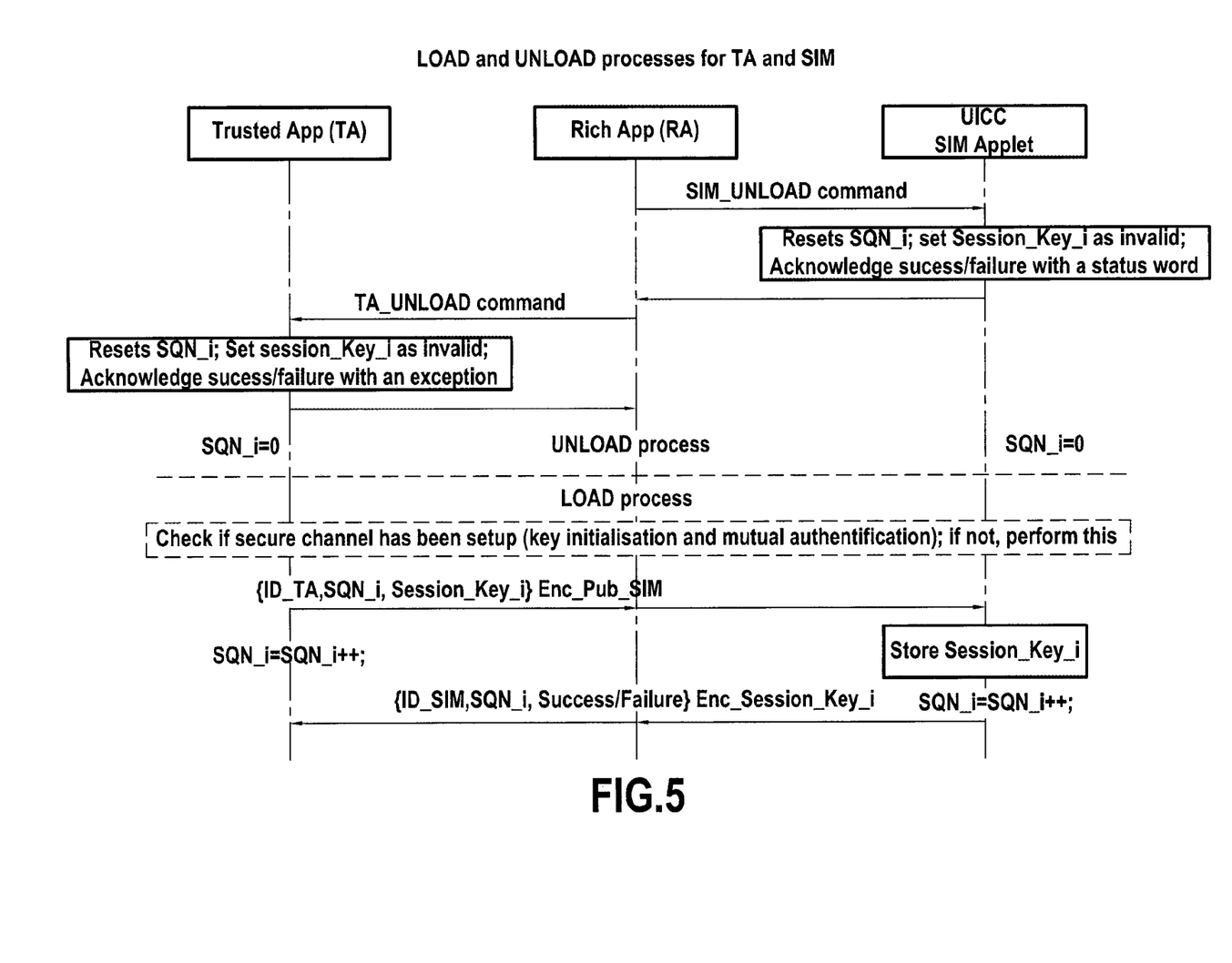
FIG. 5 is a diagram illustrating interactions between a contactless-transaction application in a host OS, a trustlet and an applet in an example process for loading and unloading the trustlet and applet.

FIG. 5 illustrates interactions that may occur in an example process implementing the loading and unloading of the secure channel.

Figure 6:
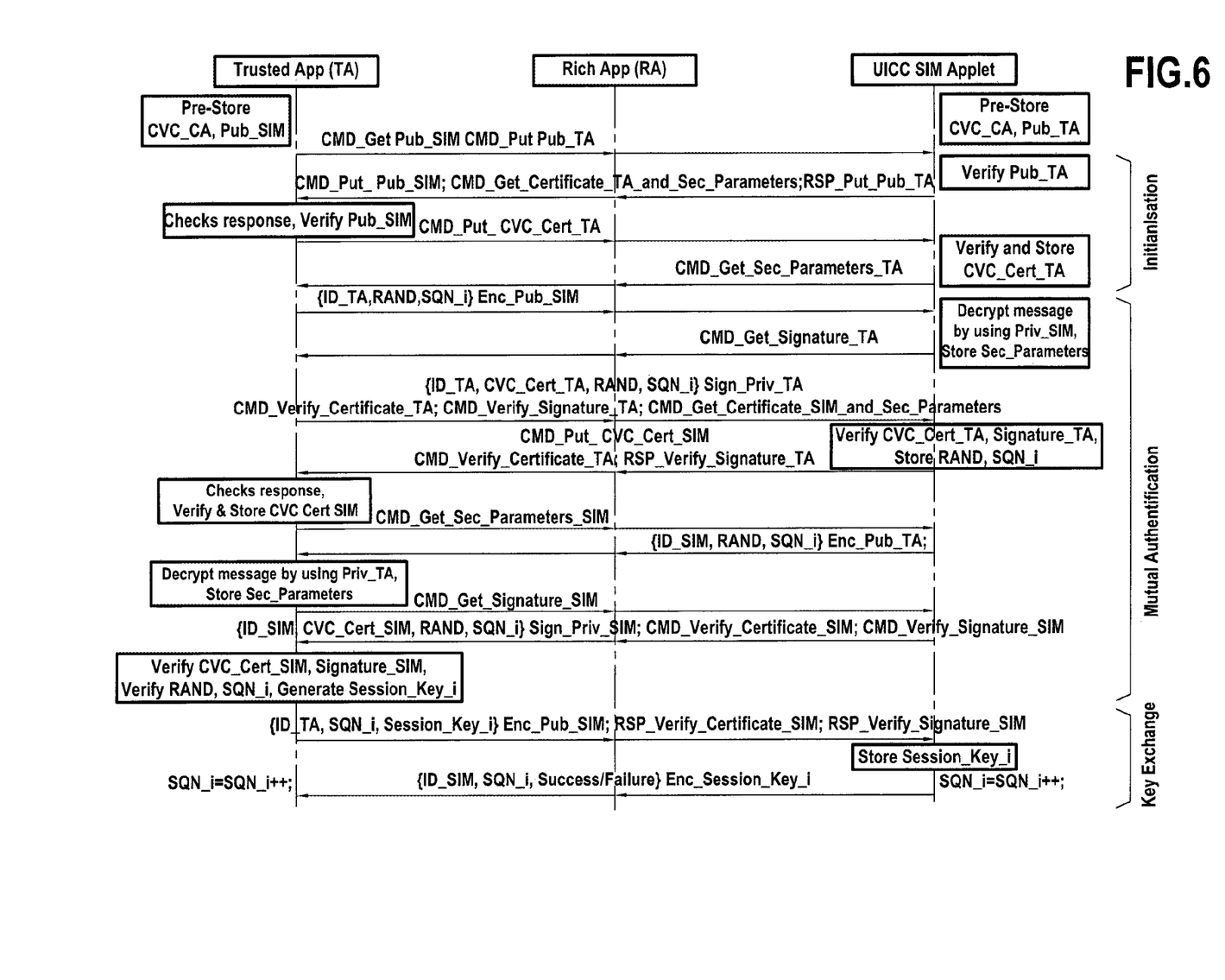
FIG. 6 is a diagram a data exchange sequence that may occur between a contactless-transaction application in a host OS, a trustlet and an applet in an example process for establishing a secure communications channel between the trustlet and applet.

FIG. 6 illustrates a data exchange sequence that may occur in an example process implementing set-up of a secure channel between the trustlet 25 associated with HCE in the TEE and the applet 27 associated with HCE in the SE 26. The secure channel is setup between HCE 25 in TEE context and HCE 27 in the SE context in order to guarantee security for any data exchanged by means of entity authentication, confidentiality and integrity of data.

An example method of performing a contactless transaction between a first NFC-enabled device 10 and a second NFC-enabled device 2, according to certain embodiments of the invention, will now be described with reference to FIGS. 7-9.

Figure 7:
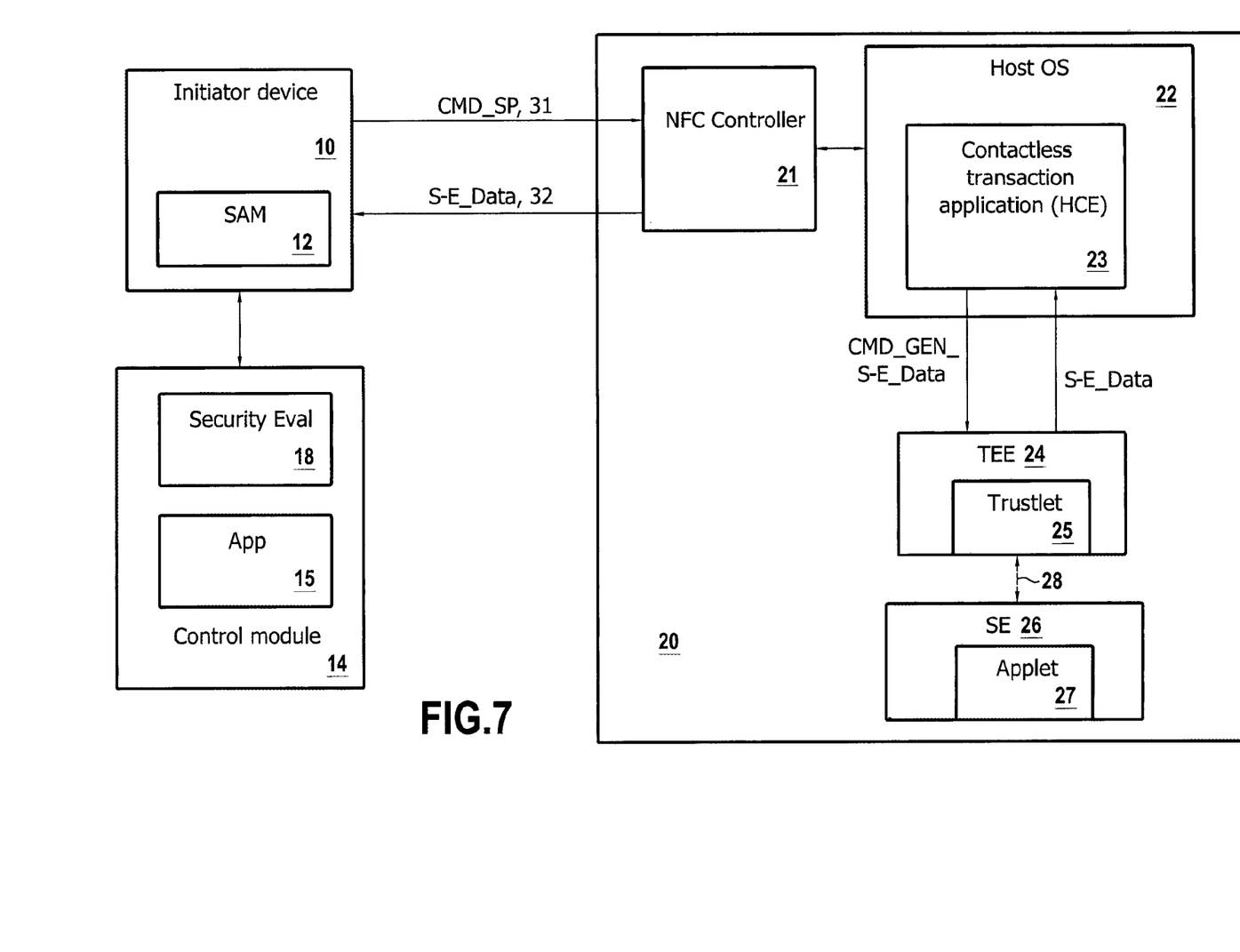
FIG. 7 is a diagram illustrating signals transmitted between a first and a second NFC-enabled device in an example method of performing a contactless transaction according to certain embodiments of the invention.

FIG. 7 is a block diagram showing certain components and signals involved in the method of the present embodiment.

As illustrated in FIG. 7, a control module 14 associated with the first NFC-enabled device 10 comprises a security-evaluation module 18. The security-evaluation module 18 is designed and/or programmed to evaluate the security requirements of different steps involved in implementation of a contactless transaction application 15. For steps that have a low security requirement it may be deemed permissible for the responder-side operations to be performed by an HCE component 23 executing in the host OS 22. Accordingly the control module 14 may control implementation of the required contactless exchanges between the initiator device 10 and the responder device 20 in a conventional manner.

However, when the security-evaluation module 18 determines that a particular step (or steps) in the application 15 require processing on the responder side and require a higher level of security (e.g. because implementation of the step may involve the responder device 20 handling sensitive data) it may be deemed undesirable for the responder-side processing to be performed by an HCE component executing in the host OS 22. In such a case, according to the present embodiment, the control module 14 controls the initiator device 10 to send to the responder device 20 a command which invokes a security protocol. When the security protocol is invoked, the responder device 20 makes use of the TEE and SE to generate security-endorsed data for return to the initiator device.

In FIG. 7 a command labelled CMD_SP is used to designate any format of signal that comprises an indication that the expected response should include data whose security is endorsed by the responder device according to the techniques of the present invention. Such an indication invokes a security protocol according to the invention. In FIGS. 8 and 9 the label CMD_Trans_Authenticate is used to designate an example of CMD_SP that requests authentication of a transaction.

CMD_SP may be a dedicated command transmitted on its own expressly for the purpose of obtaining valid security-endorsed data from the responder device 20. The return of valid security-endorsed data may serve to indicate that the responder device 20 is an authentic device having the identity expected by the initiator device 10. This may, in turn, serves to authenticate other data/transactions involved in an overall series of contactless exchanges taking place between the initiator and responder devices 10, 20. FIG. 9 illustrates a data exchange in an example where a dedicated signal CMD_Trans_Authenticate is transmitted.

Alternatively, CMD_SP may be transmitted in association with another command, for example as an indication that data to be returned in response to the other command should be generated as security-endorsed data (i.e. generated and security-endorsed by the TEE 24 and SE 26). In this case the command indicative of invocation of the security protocol may be transmitted together with the other command, or a combined command may be used.

The contactless-transaction application 23 that runs in the host OS 22 of responder device 20 is designed to interpret the command that invokes the security protocol and respond by sending to the trustlet in the TEE 24 a request (labelled CMD_GEN_S-E_Data in FIG. 7) for generation of security-endorsed data. Depending on the particular command 31 that has been sent by the initiator device 10, The request CMD_GEN_S-E_Data sent from the application 23 to the trustlet 25 may contain associated information, for example, it may identify sensitive data to be read from secure memory and returned in the form of security-endorsed data, a process that is to be performed securely (e.g. an interaction with a user to obtain a PIN) and so on. In response to the request from the contactless-transaction application 23, the trustlet 25 and secure element 26 interact with each other to generate the required security-endorsed data S-E_Data. Although the communication channel between the TEE 24 and SE 26 is illustrated in FIG. 7 using a dashed line between those components, it is to be understood that the communication takes place on a secure channel 28 via the host OS as illustrated in FIG. 2.

Figure 8:
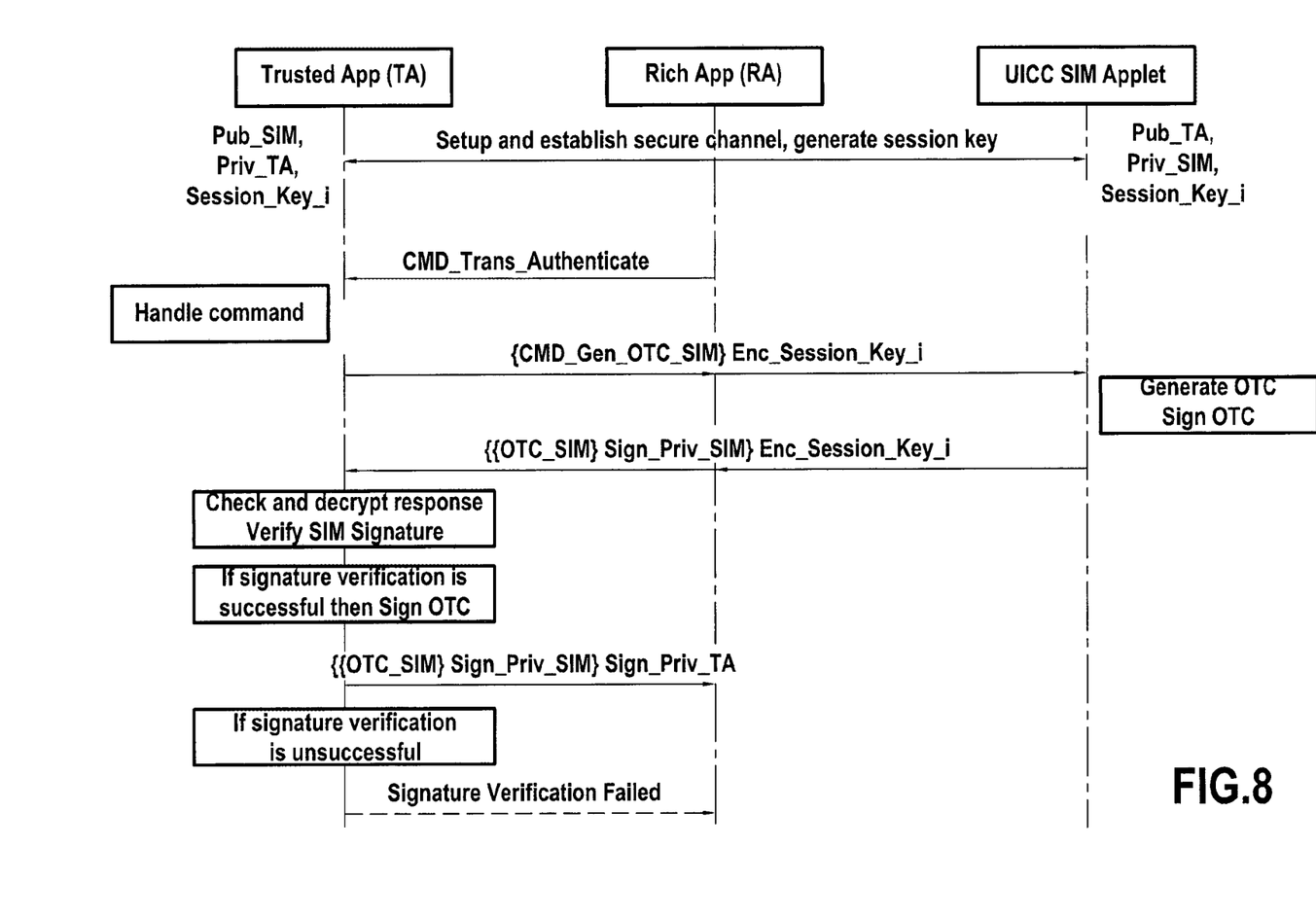
FIG. 8 is a diagram illustrating a data exchange sequence that may occur between a contactless-transaction application in a host OS, a trustlet and an applet in an example process for generating security-endorsed data according to an embodiment of the invention.

FIG. 8 illustrates a data exchange sequence that may occur between the contactless-transaction application 23 associated with HCE in the host OS, the trustlet 25 associated with HCE in the TEE and the applet 27 associated with HCE in the SE 26 in an example of the generation of security-endorsed data.

In the example illustrated in FIG. 8, the trustlet receives from the HCE component 27 in the UICC context a one time usable code (OTC) that is cryptographically generated and signed by the UICC 26. The OTC can be generated by any of various known methods. For example, according to RFC 4226, OTC(K2_OTC,C)=Truncate(HMAC-SHA-1(K2_OTC,C)), where K2_OTC is a symmetric-key and C is a counter. The HCE 25 in TEE context receives this response and validates the UICC signature and then counter-signs the data which is then passed to HCE 23 in the Rich OS context. This response is then passed to the NFC controller 21 for onward transmission 32 to the second NFC-enabled device 10 (e.g. external contactless reader) that encompasses a Secure Authentication Module (SAM) 12. SAM 12 validates the response data to ensure that it is signed by UICC 26, TEE 24 and contains the appropriate one-time useable code (OTC). The one-time useable code is validated by SAM 12 for its authenticity. For example, SAM 12 may share the K2_OTC, a synchronised counter, and the computation method with UICC 26. If authentic, then the associated contactless transaction is deemed trustworthy and successful.

In the example of FIG. 8 the security-endorsed data is a One Time Code digitally signed by the SE 26 and also digitally signed by the TEE 24. However, the security endorsement may take many different forms, typically involving measures such as encryption, digital signature, provision of a shared secret, and so on.

In the example of FIG. 8 the One Time Code is generated by the SE 26. However, a One Time Code or other data required for the security-endorsement could be generated by the TEE 24.

The HCE component 23 in the host OS context is arranged to transmit the security-endorsed data received from the TEE 24 to the initiator device 10 (possibly in association with other data, and/or after subjecting it to further processing for instance an additional encryption) in a data transmission 32 from the NFC controller. The initiator device 10 then uses the SAM 12 to authenticate the received security-endorsed data. If the SAM 12 successfully authenticates the security-endorsed data the contactless-transaction application 15 can be assured of the security of the data and can trust the data. If the SAM 12 does not successfully authenticate the security-endorsed data then security is not assured and the contactless-transaction application 15 may take some action in response (e.g. not proceed further with a sale, not allow a requested access, and so on).

Figure 9:
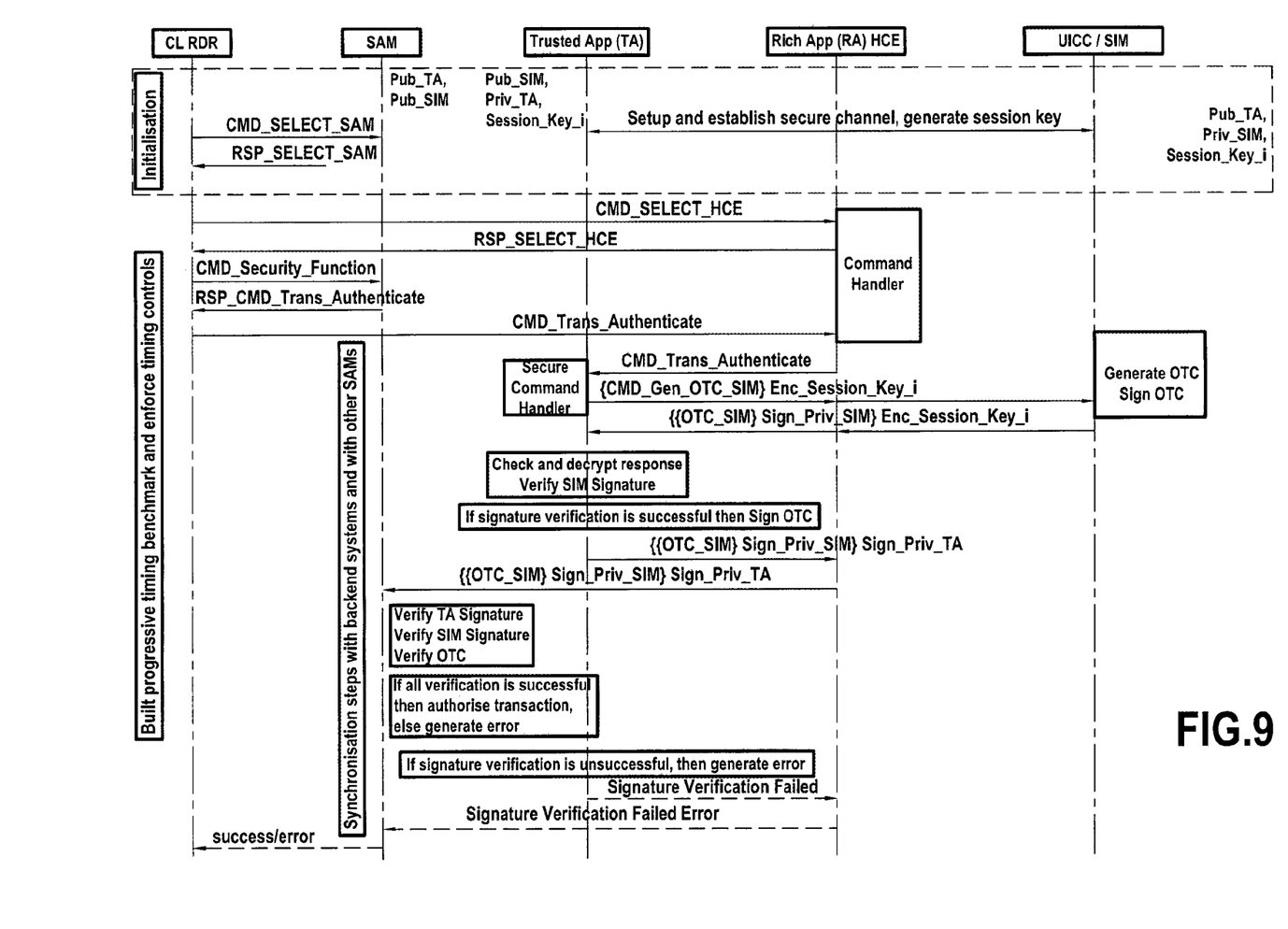
FIG. 9 is a diagram illustrating a data exchange sequence that may occur between a secure authentication module and control module of a first NFC-enabled device, and a contactless-transaction application in a host OS, a trustlet and an applet of a second NFC-enabled device in an example method of performing a contactless transaction according to certain embodiments of the invention between the first and second NFC-enabled devices.

FIG. 9 is a diagram illustrating an example of an overall series of interactions between a secure authentication module 12 and control module 14 of a contactless reader as an example of the first NFC-enabled device 10, and the contactless-transaction application 23, trustlet 24 and applet 26 of a mobile phone as an example of the second NFC-enabled device 20, to obtain security-endorsed data. In FIG. 9, the SE is a SIM, Priv_TA indicates the private key of the trustlet, Pub_TA indicates the public key of the trustlet, Priv_SIM indicates the private key of the SIM, Pub_SIM indicates the public key of the SIM, Session_Key_i indicates a session key used during communications over the secure channel, Enc_ indicates encryption by an indicated key, and Sign_ indicates application of a digital signature by the indicated entity.

Application of the above-described method prevents a malicious party from being able to successfully mount a replay attack of any captured legitimate transaction from the past. The method integrates HCE, TEE, SAM and SIM for enabling secure contactless applications.

Figure 10:
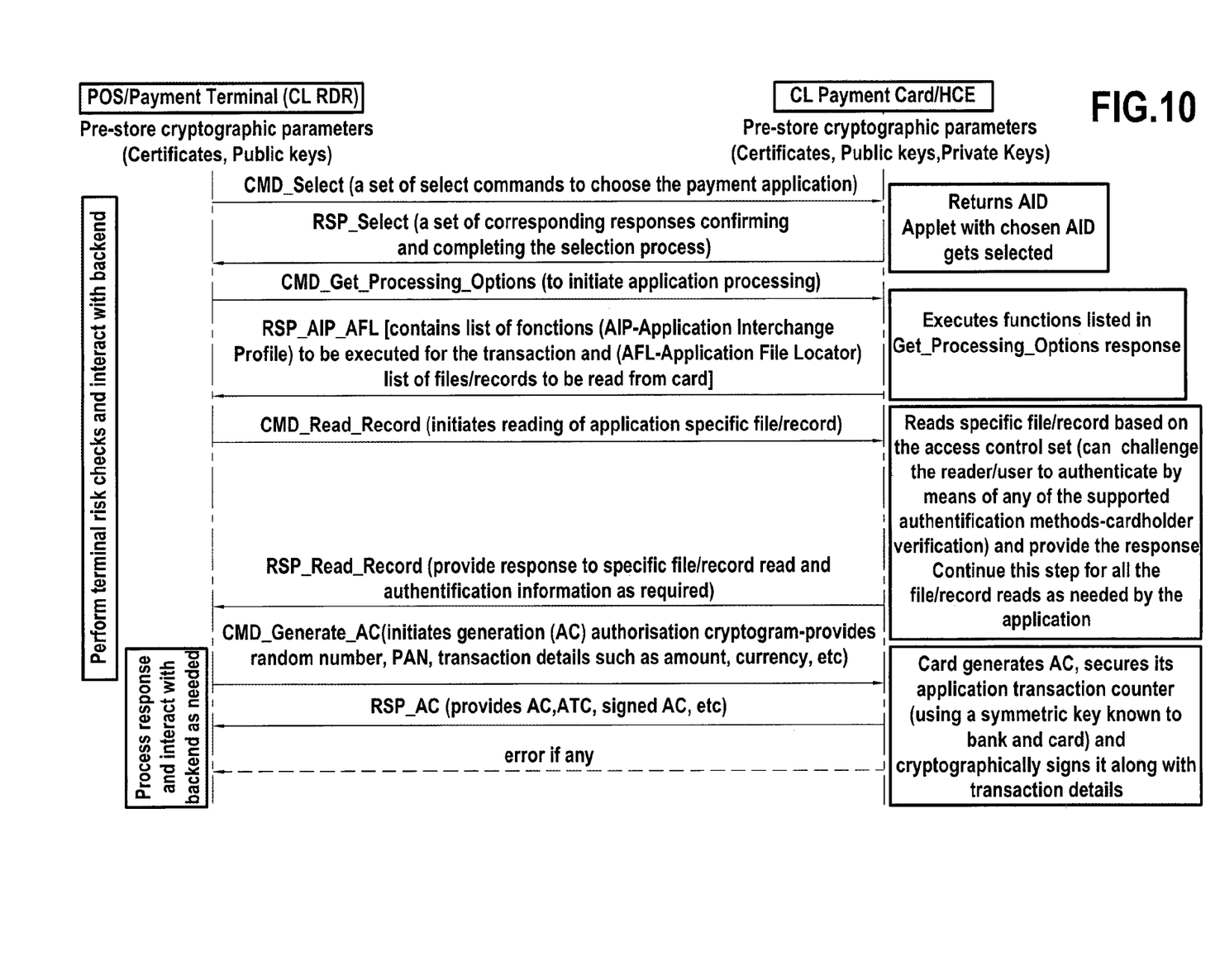
FIG. 10 is a diagram illustrating a data exchange sequence that may occur between a contactless-card reader (e.g. a point-of-sale terminal) and a contactless payment card (or NFC-enabled device having HCE capability) method of performing a contactless transaction between the reader and the card in a comparative example.

FIG. 10 is a diagram illustrating interactions between a contactless-card reader (e.g. a point-of-sale terminal) and a contactless payment card (or NFC-enabled device having HCE capability) in a comparative example method of performing a contactless transaction between the reader and the card. In this example the series of interactions involves transmission of a CMD_Select command from the payment terminal to the payment card to identify the specific payment application that is being used (e.g. "this is a MasterCard® payment"). Typically this is a low-security command because the codes identifying different applications tend to be in the public domain. However, it might be desirable to increase security for the subsequent command (CMD_Get_Processing_Options) and/or further commands. Embodiments of the present invention may be applied to provide security and trust for the data returned by the responder device in response to one command, two commands or more than two commands that are sent by the payment terminal.

Figure 11:
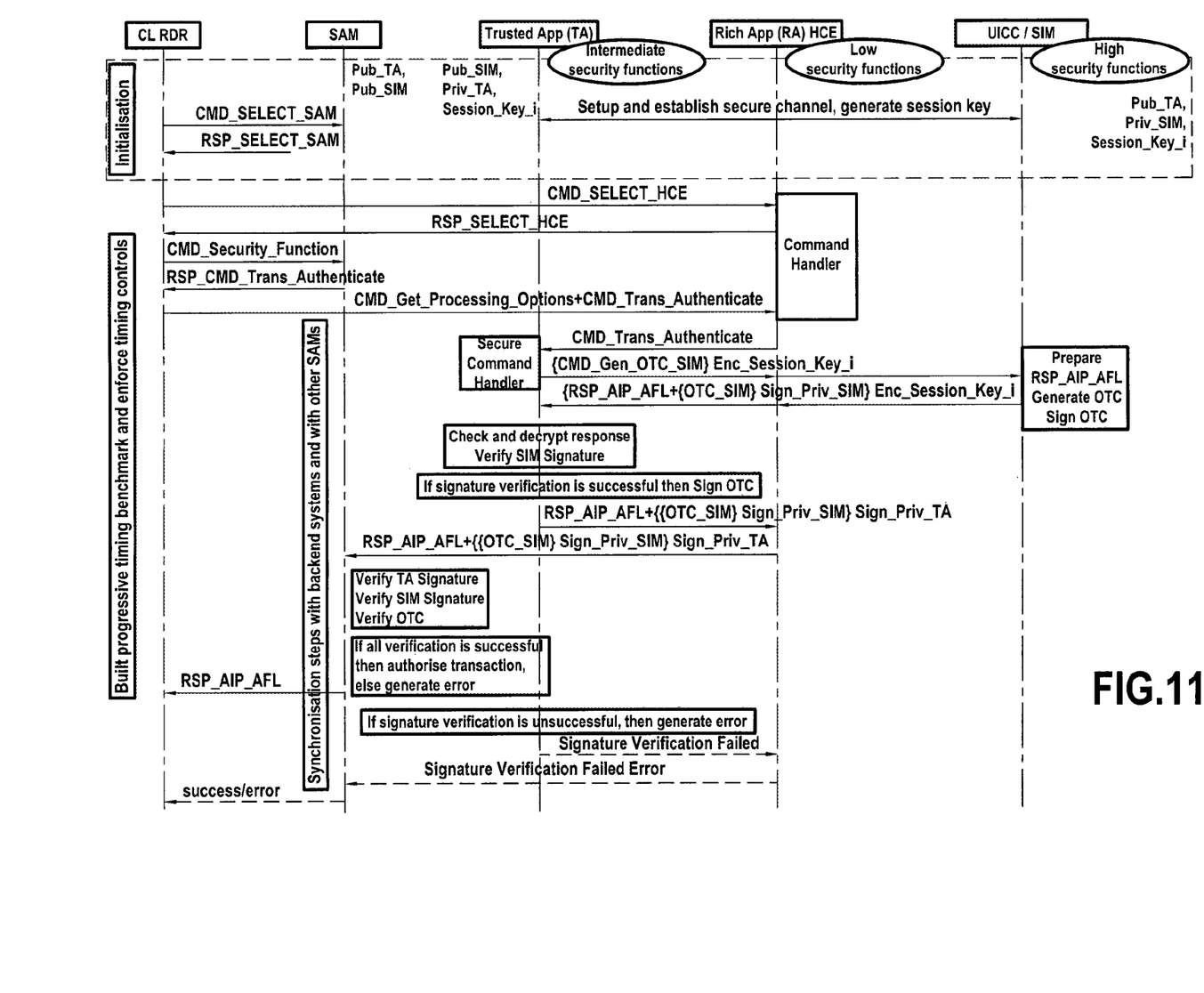
FIG. 11 is a diagram illustrating a data exchange sequence that may occur between a secure authentication module and control module of a first NFC-enabled device, and a contactless-transaction application in a host OS, a trustlet and an applet of a second NFC-enabled device, in an example method of performing the "Get Processing Options" command of FIG. 10 in a secure manner according to an embodiment of the present invention.

FIG. 11 is a diagram illustrating the case where example NFC-enabled initiator and responder devices according to certain embodiments of the invention execute the "get processing options" command shown in FIG. 10 in a manner such that security-endorsed data is returned. As indicated in FIG. 11, typically the contactless-transaction application (HCE component) 23 that runs in the host OS context employs a command handler and the trustlet 25 employs a secure command handler.

The applications, trustlets and applets mentioned above are typically implemented using machine-readable instructions that implement described functionality when the instructions are executed by a suitable processing device. Typically the applications, trustlets and applets are installed in the initiator and responder devices 10, 20, however other approaches may be permitted (e.g. installation in an ancillary device) and the machine-readable instructions may be stored on a non-transitory machine-readable medium, accessed using a network connection, and so on.

In certain embodiments of the invention a timing benchmark is built by the initiator device as the number of transactions increases. The timing benchmark may be computed for a whole transaction by measuring the time elapsed between each command and each corresponding response received from the responder device (e.g. mobile phone). This benchmark may be refined continuously taking into account the observed (permissible) variations in the measured time interval. For example, the timing benchmark could include an average (or other convenient measure) computed over all the measurements made for transactions of a corresponding type, excluding any measurements that are deemed to constitute irregularities.

The initiator device can use the timing benchmark to detect an irregularity, e.g. a transaction that is taking more time than usual. This is done, for example, by comparing the measured time interval for each command and response with the corresponding value of the timing benchmark, and/or by comparing the time taken by the transaction as a whole compared to the corresponding value in the benchmark.

If the time interval between a command and its response is uncharacteristically long this may be a sign that a relay attack is taking place. Other departures from normal timing may be signs of other undesired security problems. Accordingly, the initiator device may implement a security procedure when it detects an irregularity as described above. The nature of the security procedure may vary as desired by the designer of the application. For example, the security procedure may consist just in logging details of the transaction affected by the irregularity. In another example the security procedure consists in failure to relay the contactless transaction in question (e.g. to the processing infrastructure associated with the application).

Although the description above refers to an initiator device establishing a timing benchmark and comparing measured time intervals against the benchmark, these functions may be performed alternatively or additionally in a receptor device. Thus, for example, the TEE may measure time intervals occurring during its communication with the SE or host OS, the SE may measure time intervals occurring during its communication with the TEE, the host OS may measure time intervals occurring during its communication with the TEE, and the NFC controller may measure time intervals arising during its communication with the host OS.

Although the present invention has been described above with reference to certain specific embodiments, it will be understood that the invention is not limited by the particularities of the specific embodiments. Numerous variations, modifications and developments may be made in the specified embodiments within the scope of the appended claims.

For instance, although the detailed description above relates to the case where a responder NFC-enabled device is a mobile phone, the invention may be applied regardless of the form-factor supported by the NFC-enabled responder device. So, for example, it may be an HCE-enabled watch with SIM or any form of SE and TEE present.

As another example, although the detailed description above relates to the case where an initiator NFC-enabled device is a contactless car reader, once again the invention may be applied regardless of the form-factor supported by the NFC-enabled initiator device.

The description above refers in the singular to the contactless-transaction application in an initiator device, to the contactless-transaction application in a responder device, to a trustlet in the TEE, and to an applet in the SE. However, plural contactless-transaction applications, trustlets and applets may be provided. Further, the responder device may have other applications, trustlets and applets additional to those described above.

The invention claimed is:

1. A responder device having near field communications (NFC) capability, the responder device comprising:
   an NFC controller;
   a host operating system (host OS),
   a trusted execution environment (TEE),
   a secure element (SE),
   a contactless-transaction application configured to run on the host OS,
   a trustlet configured to run in the TEE, and
   an applet configured to run on the SE;
   wherein:
   the TEE and SE are configured to establish a secure channel for communication with each other,
   the NFC controller is configured, responsive to reception from an external device of a command invoking a determined security protocol, to transmit to the contactless-transaction application a request for security-endorsed data;

the contactless-transaction application is configured, responsive to reception of the request for security-endorsed data, from the NFC controller, to send a request to the trustlet to trigger generation of the security-endorsed data;

the trustlet is configured, responsive to said request from the contactless-transaction application, to communicate with the applet via said secure channel to generate the security-endorsed data whose security-endorsement can be validated by the external device, and to transmit the security-endorsed data to the external device via the NFC controller;

the trustlet is configured, responsive to said request from the contactless-transaction application to:
 obtain data from the applet;
 validate the data received from the applet; and
 upon validation of the data from the applet, apply a digital signature to the validated data, encrypt the digitally-signed validated data and generate the security-endorsed data comprising the encrypted and digitally-signed validated data, and transmit the security-endorsed data to the contactless-transaction application; and the responder device includes a timer configured to measure a time interval during generation of the security-endorsed data, assess the duration of the measured time interval relative to a criterion indicative of normal operation, and implement a security procedure responsive to a determination that the duration of the measured time interval does not satisfy the criterion.

2. The responder device of claim 1, wherein the NFC controller is further configured, responsive to reception of commands from the external device that do not invoke the determined security protocol, to transmit to the contactless-transaction application requests corresponding to the received commands, and the contactless-transaction application is further configured, responsive to reception of said corresponding requests, to generate return data for transmission to the external device, via the NFC controller.

3. The responder device of claim 1, wherein the applet is further configured, responsive to said request for data from the trustlet, to generate data by a process comprising application of a digital signature, and to transmit digitally-signed data to the trustlet, and the trustlet is further configured, responsive to reception of the digitally-signed data from the applet, to determine whether the digitally-signed data has a valid digital signature of the SE.

4. The responder device of claim 1, wherein the applet is further configured, responsive to said request for data from the trustlet, to generate a one-time code (OTC) and transmit data comprising said OTC to the trustlet.

5. The responder device of claim 4, wherein the TEE and SE are configured to establish said secure channel for communication with each other via the host OS, and the applet is further configured, responsive to said request for data from the trustlet, to generate said one-time code (OTC) and transmit, to the trustlet, data comprising said OTC encrypted by a first key known to the TEE and SE.

6. The responder device of claim 1, wherein the responder device is a mobile phone and the SE is a SIM.

7. A method of performing a contactless transaction between a first NFC-enabled device and a second NFC-enabled device, the first NFC-enabled device comprising a secure authentication module, and the second NFC-enabled device comprising a host operating system (host OS), a trusted execution environment (TEE), and a secure element (SE), the TEE and SE being configured to communicate via a secure channel, the method comprising:

transmitting by the first NFC-enabled device to the second NFC-enabled device of a command invoking a determined security protocol, in response to reception by the second NFC-enabled device of the command invoking the determined security protocol, transmitting, by a contactless-transaction application executing on the host OS of the second NFC-enabled device, to a trustlet that executes in the TEE, a request for security-endorsed data, said trustlet, responsive to said request from the contactless-transaction application to obtain data from the applet:
 communicating with an applet in the SE via a secure channel;
 obtaining data from the applet;
 validating the data received from the applet; and
 upon validation of the obtained data, applying a digital signature to the validated data, encrypting the digitally-signed validated data to generate security-endorsed data, and transmitting the security-endorsed data to the contactless-transaction application;

transmitting the security-endorsed data from the second NFC-enabled device to the first NFC-enabled device;

authenticating the security-endorsed data by the secure authentication module of the first NFC-enabled device; and measuring a time interval during generation of the security-endorsed data, assessing the duration of the measured time interval relative to a criterion indicative of normal operation, and implementing a security procedure responsive to a determination that the duration of the measured time interval does not satisfy the criterion.

8. The method of claim 7, further comprising the second NFC-enabled device, responsive to reception of commands that do not invoke the determined security protocol, transmitting to the contactless-transaction application requests corresponding to the received commands, and the contactless-transaction application, responsive to reception of said corresponding requests, generating return data for transmission to the first NFC-enabled device.

9. The method of claim 7, further comprising:
 the applet, responsive to said request for data from the trustlet, generating data by a process comprising application of a digital signature, and transmitting digitally-signed data to the trustlet, and
 the trustlet, responsive to reception of the digitally-signed data from the applet, determining whether the digitally-signed data has a valid digital signature of the SE.

10. The method of claim 7, further comprising the applet, responsive to said request for data from the trustlet, generating a one-time code (OTC) and transmitting data comprising said OTC to the trustlet.

11. The method of claim 10, comprising the TEE and SE establishing said secure channel for communication with each other via the host OS, and the applet, responsive to said request for data from the trustlet, generating said one-time code (OTC) and transmitting, to the trustlet, data comprising said OTC encrypted by a first key known to the TEE and SE.

12. The method of claim 7, wherein the second NFC-enabled device is a mobile phone and the SE is a SIM.

* * * * *